Sept. 6, 1949.　　L. R. BUCKENDALE　　2,480,836
VEHICLE DRIVE AXLE

Filed Oct. 5, 1944　　4 Sheets-Sheet 1

Inventor
LAWRENCE R. BUCKENDALE
By Strauch & Hoffman
Attorneys

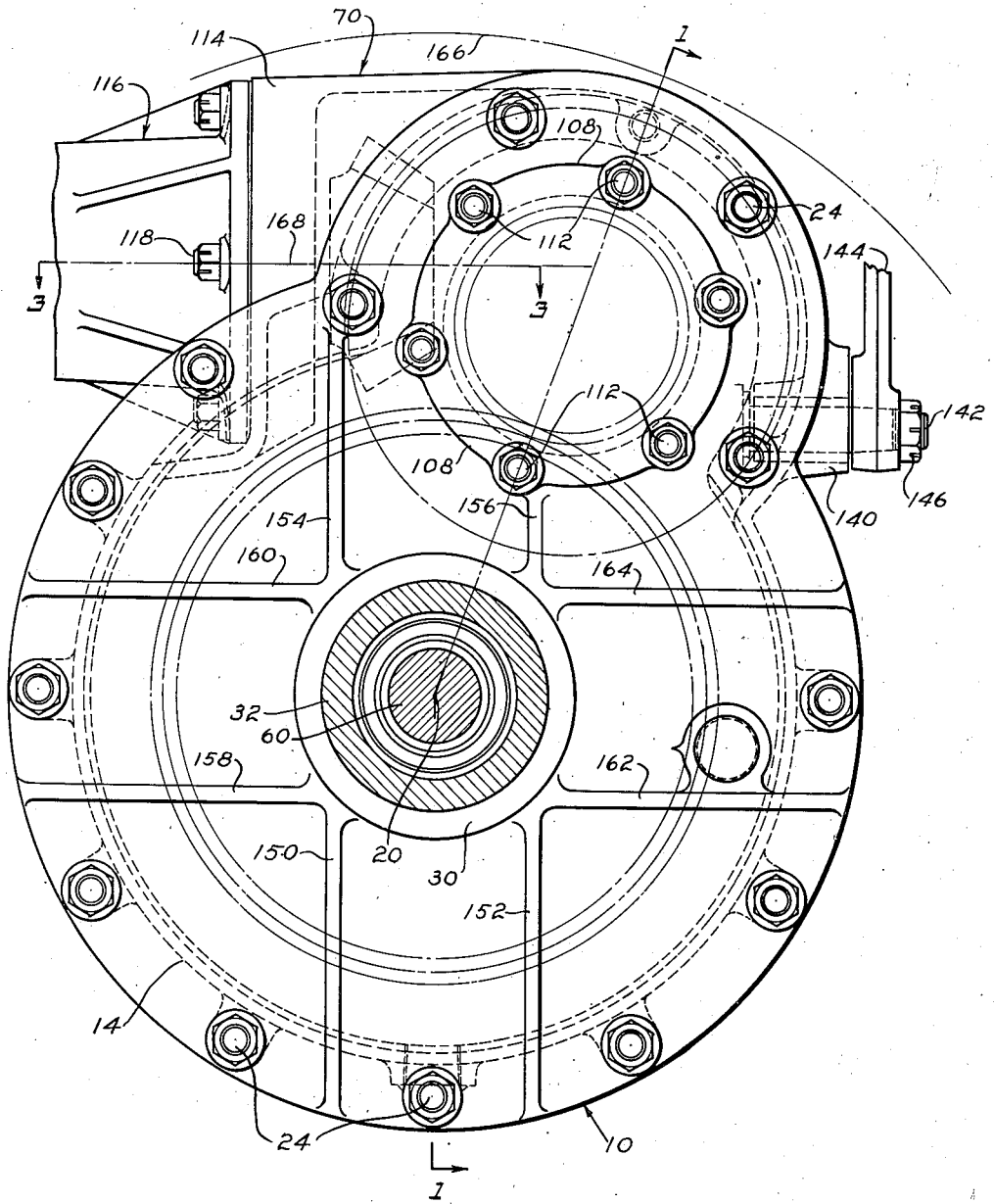

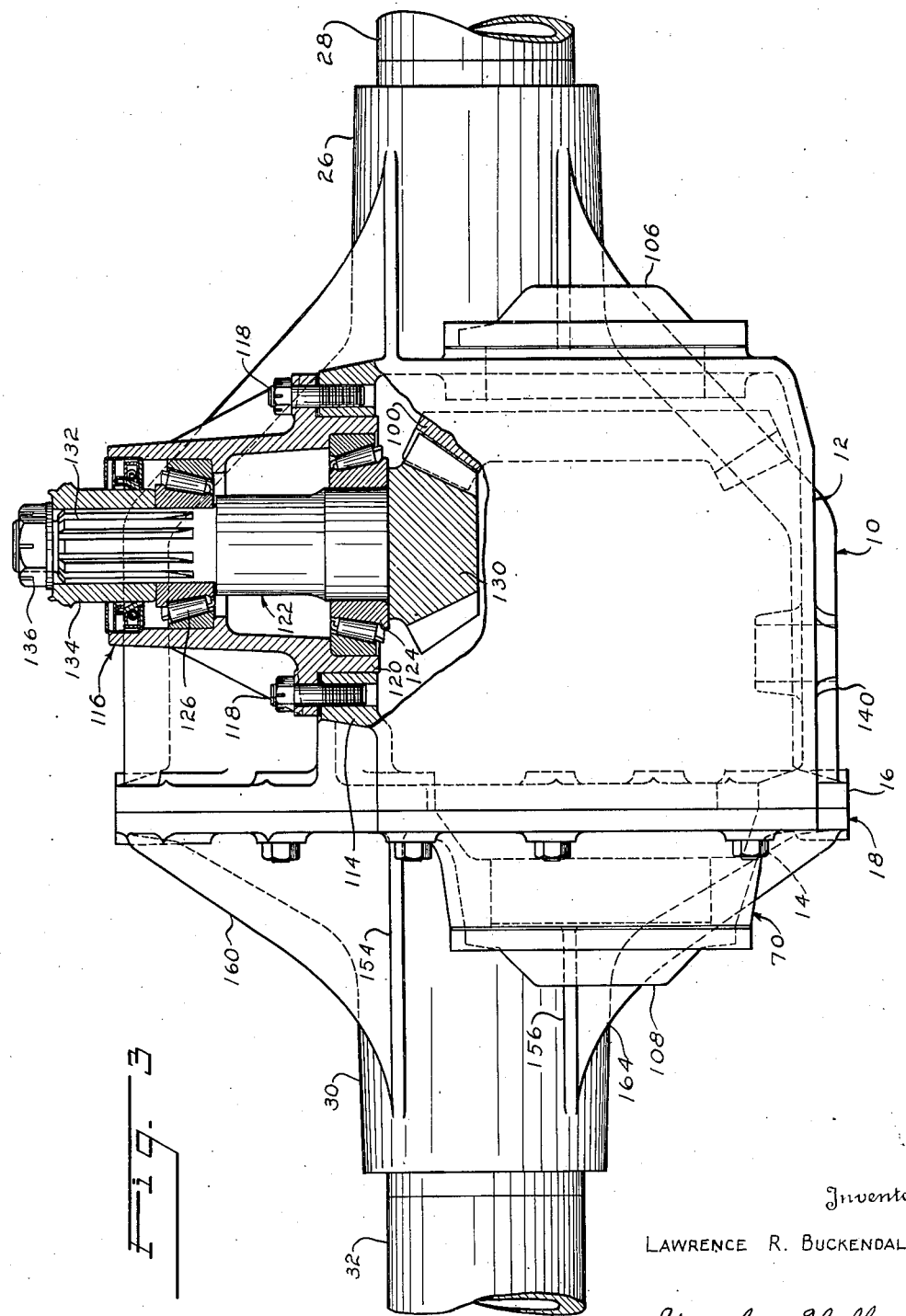

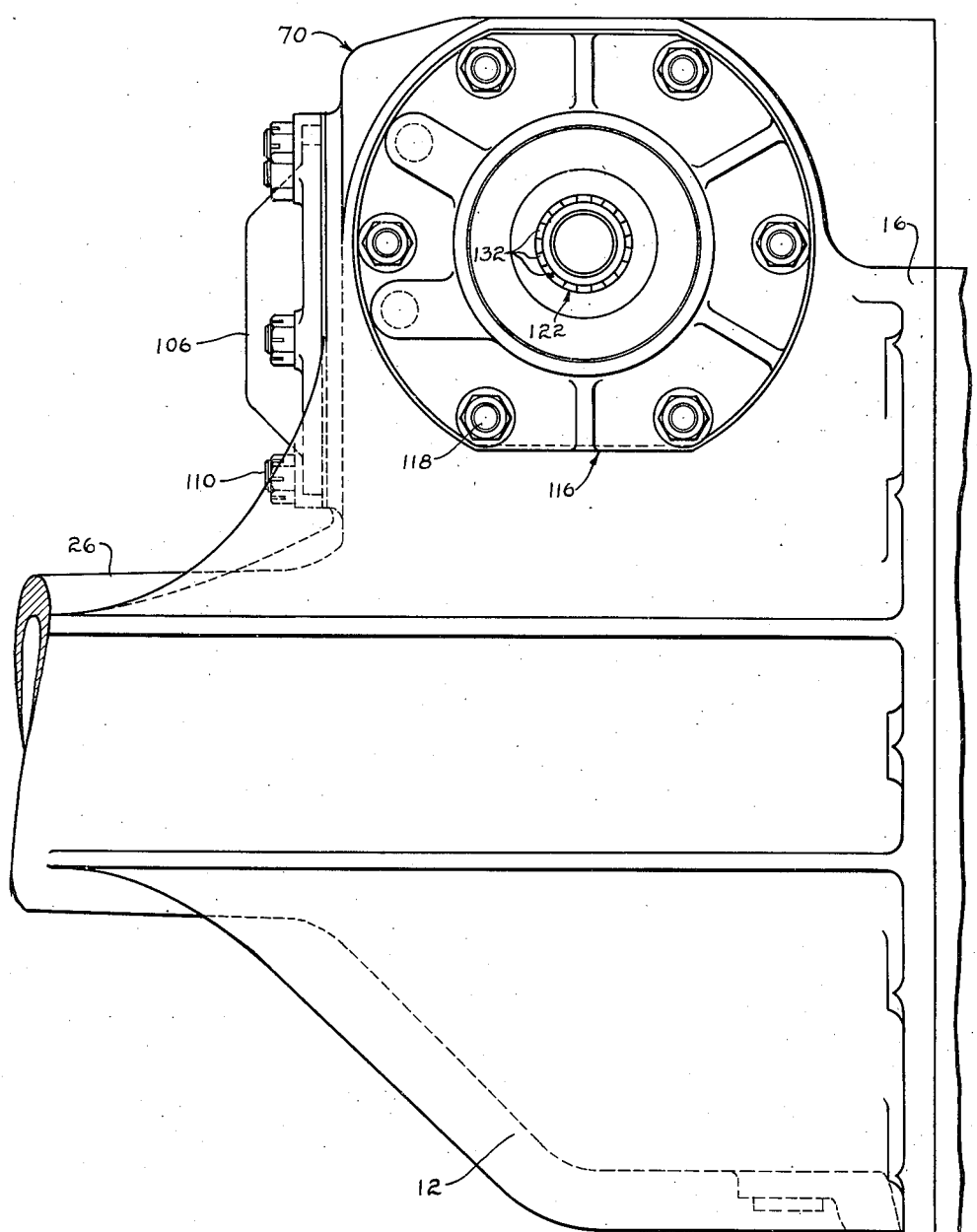

Patented Sept. 6, 1949

2,480,836

UNITED STATES PATENT OFFICE 2,480,836

VEHICLE DRIVE AXLE

Lawrence R. Buckendale, Detroit, Mich., assignor to The Timken-Detroit Axle Company, Detroit, Mich., a corporation of Ohio Application October 5, 1944, Serial No. 557,317

7 Claims. (Cl. 74—327)

This invention relates to improvements in vehicle drive axles and has particular reference to an improved two-speed, double reduction axle for light and medium weight burden vehicles such as trucks, busses and road tractors.

Recently a great deal of success has been achieved in the manufacture and operation of two-speed, double reduction axles. So far, however, such two-speed, double reduction axles have been used exclusively in heavy duty burden vehicles such as large trucks and busses to provide greater facility in handling the heavy loads such vehicles normally carry. Consequently such two-speed, double reduction axles have, so far as I am aware, been relatively heavy and expensive units having heavy duty, integrally cast or forged housings.

It is conceived, however, that this type of axle would have great advantages in lighter vehicles, for example in trucks of from one-half ton to two and one-half ton load capacity, if it could be economically produced in a weight and capacity suitable for such vehicles.

As the number of burden vehicles of the capacity indicated is extremely large and as their initial and operating costs must be maintained within definite limits for economically successful operation, it is an object of the invention to provide an improved two-speed, double reduction axle for such vehicles that can be produced by quantity production methods at a cost well within the economic limits for this type of equipment.

The provision of such axles will greatly increase the usefulness of the vehicles to which they are applied since, when equipped with the improved axle such a vehicle will be able to handle heavier loads, to operate at greater average speed on highways, to traverse rough terrain with greater facility when necessary and to exert an increased draw bar pull when used as a tractor unit of a tractor-trailer combination, or for other tractive purposes.

As the split type drive axle housing, in which the two portions of the axle are joined by bolting flanges along a vertical plane extending through the differential housing, has been found to be the most economical type and also the most satisfactory from the viewpoint of maintenance and other considerations for light vehicles, the invention contemplates the provision of a two-speed, double reduction axle having a split type housing. Also since it is contemplated that a large number of such axles will be used in short coupled vehicles, such as tractor units, the improved axle is designed to require a minimum propeller shaft angularity and to reduce the overhang of the double reduction mechanism to the practical minimum.

With these and other considerations in view, it is an important object of the invention to provide an improved vehicle drive axle having two-speed, double reduction gear mechanism and a split type housing.

A further object resides in the provision of an improved drive axle of the character indicated in which the reduction gear carrier portion of the differential housing is offset in a direction to reduce or eliminate the overhang of such portion and reduce the angularity of the vehicle propeller shaft.

A still further object resides in the provision of an improved vehicle axle of the character indicated wherein the various parts and particularly the differential housing is adapted for manufacture on usual types of mass production machine tools.

An additional object resides in the provision of an improved drive axle of the character indicated which is light in weight, economical to manufacture and which may be installed in place of a standard or conventional vehicle axle without any material alteration or modification of the vehicle chassis.

A further object resides in the provision of an improved two-speed, double reduction drive axle in which a hypoid primary reduction gear train is combined with a spur type two-speed reduction gear train to provide a drive axle of maximum capacity and flexibility for its size and weight.

Other objects and advantages will be apparent from the following description in conjunction with the accompanying drawings and from the appended claims.

In the accompanying drawings, in which like reference numerals are used to designate similar parts throughout, there is illustrated a suitable embodiment for the purpose of disclosing the invention. The drawings however are for purposes of illustration only and are not to be taken in a limiting or restrictive sense since it will be apparent to those skilled in the art that various changes in the illustrated construction may be resorted to without in any way exceeding the scope of the invention.

In the drawings:

Figure 2 is an end elevational view of an axle constructed according to the invention;

Figure 3 is a sectional view taken on the line 3—3 of Figure 2; and

Figure 4 is a front elevational view of a part of the center portion of the axle.

Figure 1:
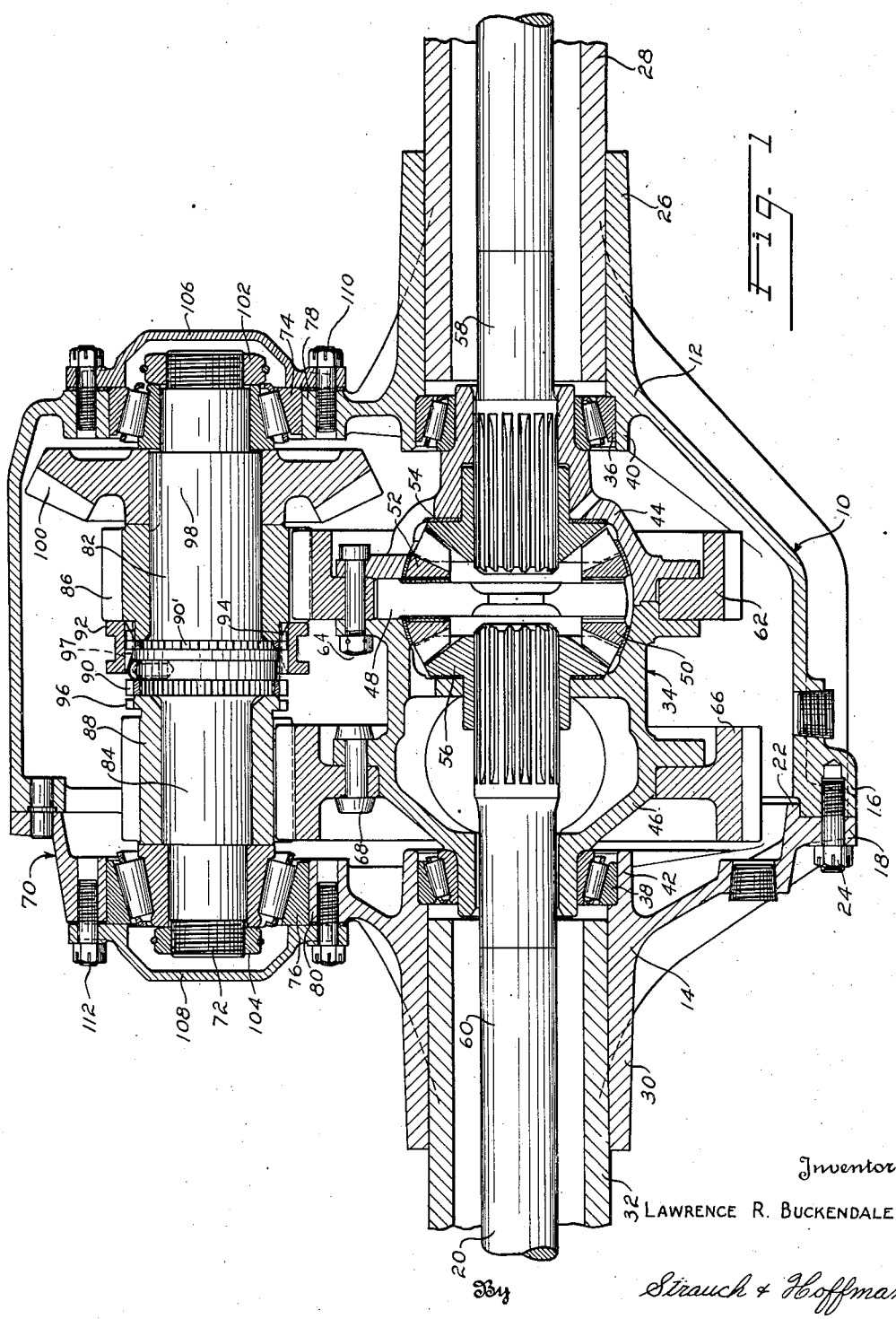
Figure 1 is a sectional view of the center portion of a vehicle drive axle constructed according to the invention, taken on the line 1—1 of Figure 2.

With continued reference to the drawings, the numeral 10 generally indicates the center portion or differential housing of the housing of the improved axle construction. This center portion is formed in two parts, as indicated at 12 and 14, joined together by mating bolting flanges 16 and 18 along a plane which intersects and is perpendicular to the longitudinal center line 20 of the axle, which center line is coincident with the axis of rotation of the differential.

In the arrangement illustrated the bolting flange 18 is provided around its inner edge with a pilot rib 22 and the bolting flange 16 is provided with a machined recess or rabbet which contacts the corresponding surface of the pilot rib to positively pilot the two parts of the center portion of the housing in respect to each other. The two parts are secured together by suitable stud bolts 24 which extend through the bolting flanges and clamp them together.

The part 12 is provided with a cylindrical boss 26 which receives the corresponding end of a tubular arm portion 28 which extends outwardly from the portion 10 to carry a vehicle spring and a road wheel, not illustrated. Part 14 is provided with a similar boss 30 which receives the corresponding end of a tubular arm 32 which extends outwardly from the portion 10 to receive the spring and road wheel on the opposite side of the vehicle. Within the hollow center portion 10 a two-part differential cage, generally indicated at 34, is journalled at its ends by suitable anti-friction bearing means, such as the roller bearing 36 and 38, mounted in respective bearing seats 40 and 42 formed integrally in the housing parts 12 and 14.

The two parts 44 and 46 of the differential cage 34 are separable along a plane including the radial axes of differential spider 48 which carries differential pinion gears, as indicated at 50 and 52, which mesh with side gears 54 and 56 journalled in the differential cage and splined to the corresponding ends of respective axle shafts 58 and 60, which extend through the respective tubular arms 28 and 32 to the corresponding road wheels in a manner well known to the art.

A spur type differential drive gear 62 is mounted on the cage part 44 adjacent the connection between the parts 44 and 46 and is secured in position on the differential cage by through bolts, one of which is indicated at 64, which also serve to secure the two parts of the differential cage together. Additional bolts or dowel members may be used to assist in maintaining the gear in proper position on the differential cage.

A second spur type differential drive gear 66 is mounted on the cage part 46 by suitable means such as rivets, one of which is indicated at 68, extending through overlapping flanges provided internally of the gear and externally of the differential cage part.

On one side thereof the axle center portion 10 is provided with an offset, particularly illustrated in Figure 2 and generally indicated at 70. Within the offset or extension 70 there is a cross-shaft or counter-shaft, generally indicated at 72, journalled at its ends in the axle housing by suitable anti-friction bearing means, such as the roller bearing 74 and 76 mounted in respective bearing seats 78 and 80 formed integrally in the offset portions of the respective parts of the center portion of the axle housing.

The cross-shaft 72 has reduced end journal portions received in the inner races of bearings 74 and 76 and between these end portions has journal portions 82 and 84 upon which are journalled respective spur gears 86 and 88 which mesh with the gears 62 and 66 respectively. Between the journal portions 82 and 84 the shaft 72 is provided with integral annular clutch enlargements or extensions 90 and 90' provided with peripheral clutch teeth which engage with the internal clutch teeth of a clutch collar 92 which surrounds and is laterally slidable upon the cross-shaft. Gear 86 is provided with clutch teeth 94 engageable by the teeth of collar 92 and gear 88 is provided with clutch teeth 96 engageable by the teeth of the clutch collar so that either one of the gears 86 or 88 may be selectively coupled to the cross-shaft 72 for rotation therewith. Collar 92 is provided with an annular external groove to receive engaging portions of a clutch shifting collar or yoke, not illustrated, and the cross-shaft carries a plurality of spring pressed detents, one of which is shown in dotted lines at 97, which engage with specially beveled teeth in the clutch collar to retain the collar in either one of its two operative positions.

The cross-shaft 72 is also provided with a splined or keyed portion 98 upon which is fixed a bevel ring gear 100.

The inner races of bearing 74 and 76 are retained on the ends of cross-shaft 72 by suitable means such as the respective end nuts 102 and 104 and the outer races are positioned in the bearing seats 78 and 80 by the cover plates 106 and 108 secured to the bearing seat portions 78 and 80 of the housing parts 12 and 14 by suitable stud bolts or cap screws as indicated at 110 and 112.

With this arrangement when the cross-shaft 72 is driven by ring gear 100 it will drive one of the spur gears 86 or 88, depending upon the position of clutch collar 92, which will in turn drive the corresponding differential spur gear 62 or 66 and these gears, through the intermediacy of the differential cage, spider, pinion gears, and side gears, will drive the axle shafts 58 and 60 at a speed selected in accordance with the position of the clutch collar 92.

The offset 70 is provided at one side thereof with an open annular boss 114 having its longitudinal center line at right angles to the center line of cross-shaft 72 but disposed radially outwardly therefrom, as is clearly illustrated in Figure 2.

A generally cylindrical bearing cage, generally indicated at 116, is secured to boss 114 by suitable means, such as the stud bolts or cap screws 118, and is piloted therein by the flanged portion 120 projecting within the aperture of the boss, as is particularly shown in Figure 3.

A propeller shaft section, generally indicated at 122, is journalled in the bearing cage 116 by spaced anti-friction means, such as the roller bearing 124 and 126. The axis of rotation of shaft 122 is disposed in a horizontal plane parallel to and above the level of the axis of rotation of cross-shaft 72.

At its inner end the shaft section 122 carries a beveled pinion gear 130, which may be formed integrally therewith, meshing with the beveled ring gear 100 and at its outer end the shaft section is splined, as indicated at 132, to receive a driving element, such as the universal joint flange 134, the end nut 136. The bearings 124 and 126 are mounted and preloaded in a generally conventional manner and a detailed description of this construction is believed unnecessary for the purposes of the present disclosure.

As shown in Figure 2, the offset 70 is provided with a small apertured boss 140 on the side thereof opposite the boss 114 and this boss 140 rotatably receives a shaft 142 which extends through the housing immediately below the clutch collar 92 and carries a shift fork, not illustrated, for moving the clutch collar from one to the other of its operative positions. On its outer end shaft 142 carries a lever 144 secured thereon by an end nut 146, which lever is operably connected with a manual or power operated shift mechanism to selectively change the axle gear ratio.

As is clearly illustrated in Figure 2, the offset 70 is located above the longitudinal center line 20 of the axle and is angularly spaced rearwardly relative to a vertical plane including the longitudinal center line 20 of the axle in a manner such that the center of the offset, or the axis of the cross-shaft 72 is disposed on the opposite side of the vertical plane from the open end of boss 114 which receives the propeller shaft section 122. It is also apparent from an inspection of Figure 2 that the axis of the propeller shaft section 122 is spaced above the axis of cross-shaft 72. By this arrangement the axis of the propeller shaft section is raised the maximum permissible distance above the longitudinal axis of the axle without restricting the necessary clearance between the axle and the chassis of the vehicle. This provides the substantial advantage of reducing the angularity of the vehicle propeller shaft and greatly increasing the service life of the propeller shaft universal joints. Also, by raising the offset portion above the main portion of the differential housing and disposing it to the rear of the vertical plane including the housing axis or to that side of the vertical plane opposite the propeller shaft section 122, the overhang of the portion carrying the primary reduction gear train and the cross-shaft is reduced or substantially eliminated so that the weight of this part of the gear mechanism and its carrier does not impose any turning or twisting forces on the axle.

The housing of the improved axle is designed for minimum weight with adequate strength and rigidity. This is accomplished by maintaining the walls of the housing center portion relatively thin, as is particularly illustrated in Figure 1, and by providing an unusually large number of deep reinforcing flanges or ribs at proper locations to provide adequate reinforcement where needed, as is particularly shown in Figures 2 and 3. These reinforcing ribs or flanges for each of the housing portions 12 and 14 are arranged in the form of a cross centered on the corresponding boss portion 26 or 30. In this arrangement the spaced parallel ribs 150, 152, 154 and 156 extend vertically of the housing on the portion 14 while the spaced parallel ribs 158, 160, 162 and 164 extend horizontally. Intersecting ribs are run together where they approach the outer surface of the boss portion and merge into the boss to provide additional material in the critical zone along the inner end of the boss portion. Ribs 150, 152, 154, 158, 160, 162 and 164 merge at their outer ends into bolting flange 18 and the vertical rib 156 merges into the boss comprising the bearing seat 80. Similar ribs are provided on the housing portion 12, as clearly shown in Figures 3 and 4.

The housing center portion is preferably formed of iron castings machined on contacting surfaces to provide close fits between the component parts and otherwise machined to provide bolt holes, bearing seats and other operative surfaces of the necessary accuracy. It is conceived that these parts could be most rapidly and economically produced on standard automatic machinery by conventional production methods. For example, the two parts 12 and 14 of the center portion of the housing could be economically machined on multiple head automatic machines of conventional type. However, such machines have a limited clearance and unless the maximum radius of the part to be machined falls within this clearance the part cannot be set up on such a machine and indexed to successive stations for the various machining operations. The clearance of a typical standard size machine of the character indicated is indicated by the arc 166 on Figure 2.

With the necessary size of the gears and other working parts of the axle it is obvious that if the full accumulative offsets for the reduction gear trains were allowed the maximum radius of the housing parts would materially exceed the indicated clearance dimension. For example, axle housing parts of the form shown in United States Patent 2,309,432 for the same size axle could not be successfully machined on the type of automatic multiple head machines referred to above. In the axle housing of the invention, however, the dimensions are kept within the machine clearance, as is clearly illustrated in Figure 2. This is done by establishing a minimum distance between the center line 20 and the portion of the offset 70 most remote from the center line by disposing the offset in such a manner that the center line 168 of the propeller shaft section and a line in a common plane perpendicular to the axle center line or differential axis and passing through the differential axis and the axis of cross-shaft 72 intersect at a point spaced from the cross-shaft axis and include an acute angle between them on the side adjacent said propeller shaft section. This arrangement also provides a housing requiring minimum clearance for a housing having a top mounted bevel gear train.

In order to compensate for the condition wherein the axis of the propeller shaft section does not intersect the axis of the cross-shaft the gears 100 and 130 may be of the hypoid type familiar to the art. This permits the use of an extremely small ring gear 100 while maintaining the capacity of this primary gear reduction equal to or greater than the capacity of the straight bevel gear train of a standard axle for the particular size and type of vehicle. This permits the use of an offset of small diameter to inclose the primary reduction gear train and the cross-shaft and cross-shaft carried gears of the two-speed secondary gear train.

While the two-speed gear train has been hereinabove referred to as a reduction gear train this description was for convenience only as the two-speed gear train may be either underdrive or overdrive or one side may be underdrive and the other overdrive as the conditions of any particular installation may require.

There is thus disclosed a practical two-speed, double reduction axle for light trucks and similar vehicles which is light in weight and yet of adequate strength and rigidity and which is economical to manufacture and simple to install and which, when installed on a vehicle of the character indicated, will greatly increase the usefulness of the vehicle by rendering a relatively light vehicle fully capable of heavy duty service when required.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle drive axle, an axle housing adapted to extend transversely of the vehicle and having an enlarged intermediate portion, differential axle shaft driving means journaled in said enlarged housing portion on a substantially horizontal axis extending transversely of said vehicle, a cross shaft mounted on said enlarged housing portion with its axis in a horizontal plane parallel to and above the axis of said differential, a pinion shaft rotatably mounted in said enlarged housing portion above the level of the axis of said differential and extending at an angle to said cross shaft, and gearing within said enlarged housing portion providing a double reduction selective two speed drive between said pinion shaft and said differential means, the axis of said cross shaft being disposed on the opposite side of a vertical plane containing the axis of said differential means from said pinion shaft mounting.

2. In a vehicle drive axle, an axle housing having an enlarged intermediate portion, differential mechanism journaled within said enlarged housing portion, a pinion shaft rotatably mounted on said enlarged housing portion, a cross shaft mounted within said enlarged housing portion parallel to the axis of rotation of said differential mechanism, the axes of said differential mechanism, cross shaft and pinion shaft being disposed at successively higher levels and the axis of said cross shaft being disposed on the opposite side of a vertical plane containing the axis of said differential mechanism from said pinion shaft mounting, meshed hypoid pinion and ring gears on the pinion and cross shafts respectively providing a first drive reduction, and gearing between said cross shaft and differential mechanism providing a selective two speed second drive reduction within said axle.

3. In a vehicle drive axle, an axle housing containing a rotatable differential mechanism and comprising two separate housing parts enlarged at their adjacent ends and secured together along a plane substantially perpendicular to the axis of rotation of said differential mechanism to provide an enlarged intermediate portion in said housing enclosing said differential mechanism, bearing means in said respective housing parts for journaling said differential mechanism on said axis, a cross shaft having its axis parallel to the axis of said differential mechanism, bearing means in said respective housing parts for journaling said cross shaft, a pinion shaft disposed at an angle to said cross shaft, said pinion, cross shaft and differential axes being stepped at successively lower levels, bearing means in one of said housing parts for mounting said pinion shaft on said axle housing, cooperating pinion and ring gears on said pinion shaft and cross shaft respectively for providing a first drive reduction, constantly meshed gear pairs on said cross shaft and differential mechanism providing two different speed second drive reductions, and clutch means operatively connecting either of said gear pairs to be driven by said cross shaft, the axis of said cross shaft being disposed on the opposite side of a vertical plane containing the axis of said differential mechanism from said pinion shaft bearing.

4. In a drive axle, an axle housing containing a rotatable differential mechanism and comprising two separate housing parts enlarged at their adjacent ends and secured together along a plane substantially perpendicular to the axis of rotation of said differential mechanism to provide an enlarged intermediate section in said housing enclosing said differential mechanism, each of said enlarged housing part ends having an offset portion projecting upwardly from said housing and displaced laterally with respect to a vertical plane containing the axis of said differential mechanism, aligned bearings in the respective housing parts for journaling said differential mechanism, aligned bearings in said respective offset portions, a pinion shaft mounted in bearings on one of said offset portions, a cross shaft mounted in said last-named bearings, the axis of said cross shaft being parallel to and above said differential mechanism axis and also disposed on the opposite side of said vertical plane from said pinion shaft mounting, and gearing in said enlarged housing portion providing a double reduction selective two speed drive between the pinion shaft and said differential mechanism.

5. In a vehicle drive axle, an axle housing adapted to extend transversely of the vehicle and having an enlarged intermediate portion, differential axle shaft driving means journaled in said enlarged housing portion on a substantially horizontal axis extending transversely of the vehicle, a cross shaft mounted on said enlarged housing portion with its axis in a horizontal plane parallel to the axis of said differential, a pinion shaft rotatably mounted in said enlarged housing portion and extending at an angle to said cross shaft, said pinion shaft, cross shaft and differential being stepped at successive levels, and gearing within said enlarged housing portion providing a double reduction selective two speed drive between said pinion shaft and said differential means, the axis of said cross shaft being disposed on the opposite side of a vertical plane containing the axis of said differential means from said pinion shaft mounting.

6. In the vehicle drive axle defined in claim 5, said enlarged housing portion being transversely split and being formed with an offset portion in which both said cross shaft and pinion shaft are mounted.

7. In a vehicle drive axle, an axle housing containing a rotatable differential mechanism and comprising two separate housing parts enlarged at their adjacent ends and secured together along a plane substantially perpendicular to the axis of rotation of said differential mechanism to provide an enlarged intermediate portion in said housing enclosing said differential mechanism, bearing means in one of said housing parts for maintaining a pinion shaft in said axle housing, bearing means in said respective housing parts for journaling said differential mechanism on said axis, a cross shaft having its axis parallel to the axis of said differential mechanism and disposed on the opposite side of a vertical plane containing the axis of said differential mechanism from said pinion shaft bearing, bearing means in said respective housing parts for journaling said cross shaft, a pinion shaft mounted in said pinion shaft bearing and disposed at an angle to said cross shaft, said pinion shaft, cross shaft and differential axes being stepped at successive levels, cooperating pinion and ring gears on said pinion shaft and cross shaft respectively for providing a first drive reduction, constantly meshed gear pairs on said cross shaft and differential mechanism providing two different speed second drive reductions, and clutch means operatively connecting either of said gear pairs to be driven by said cross shaft.

LAWRENCE R. BUCKENDALE.

REFERENCES CITED

The following references are of record in the file of this patent:

UNITED STATES PATENTS

| Number | Name | Date |
|---|---|---|
| 1,238,044 | Murray | Aug. 21, 1917 |
| 1,334,325 | Sternberg | Mar. 23, 1920 |
| 1,442,498 | Sternberg | Jan. 16, 1923 |
| 1,493,175 | Wolf | May 6, 1924 |
| 1,569,664 | Mogford | Jan. 12, 1926 |
| 1,903,146 | Sterling | Mar. 28, 1933 |
| 2,096,834 | Allison | Oct. 26, 1937 |
| 2,120,594 | Alden | June 14, 1938 |
| 2,131,531 | Behrens | Sept. 27, 1938 |
| 2,180,962 | Ormsby | Nov. 21, 1939 |
| 2,183,667 | Buckendale | Dec. 19, 1939 |
| 2,203,282 | Keese | June 4, 1940 |
| 2,204,287 | Wilbur | June 11, 1940 |
| 2,309,432 | Alden | Jan. 26, 1943 |
| 2,351,590 | Alden et al. | June 20, 1944 |
| 2,384,781 | Rockwell et al. | Sept. 11, 1945 |

FOREIGN PATENTS

| Number | Country | Date |
|---|---|---|
| 690,382 | Germany | Apr. 24, 1940 |
| 718,193 | France | Jan. 20, 1932 |